Sept. 11, 1928.  W. K. CADMAN  1,683,952
PHANTOGRAPH
Filed May 17, 1926   3 Sheets-Sheet 1

Inventor
W. K. Cadman,
By Clarence A. O'Brien
Attorney

Sept. 11, 1928.
W. K. CADMAN
PHANTOGRAPH
Filed May 17, 1926   3 Sheets-Sheet 2
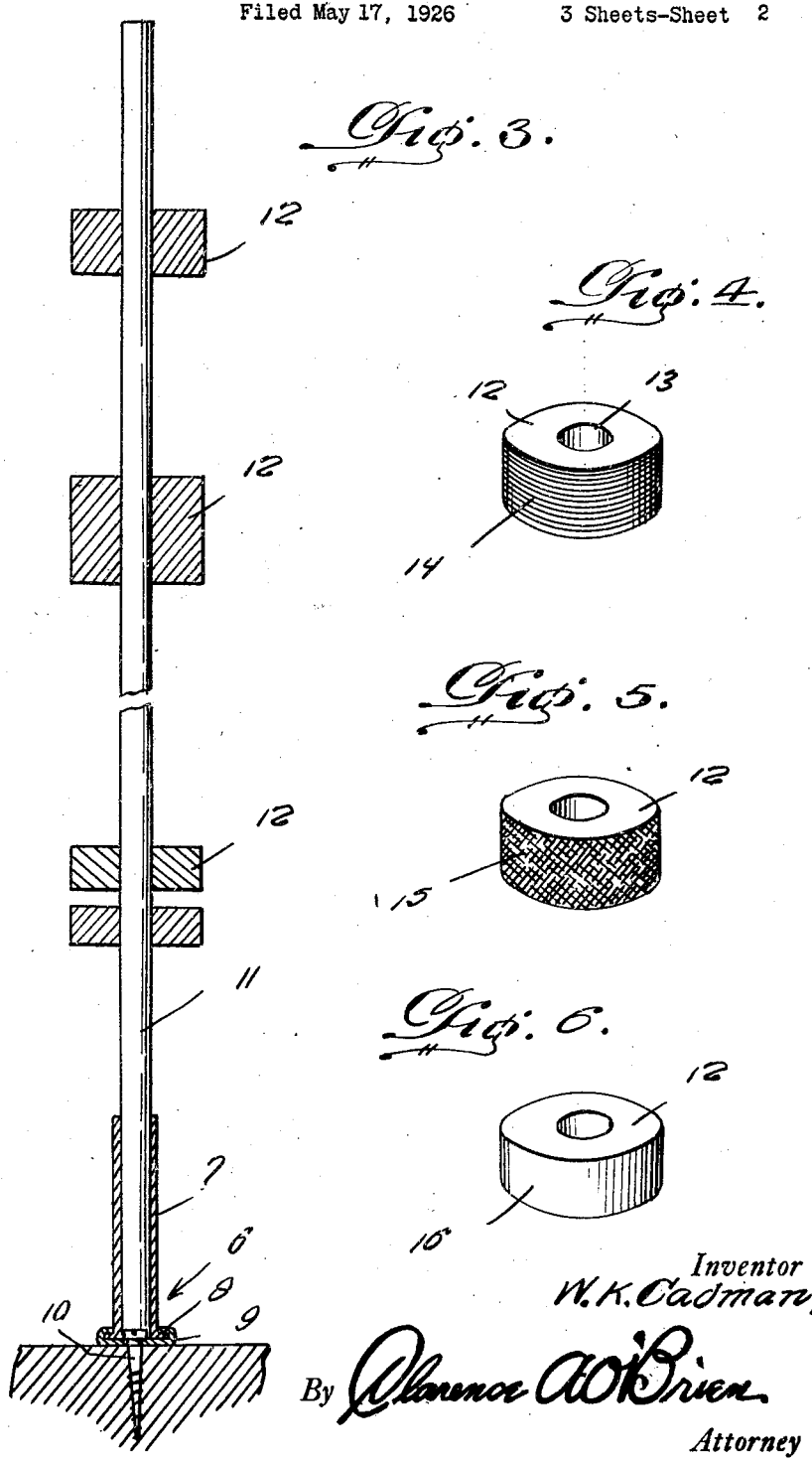
Inventor
W. K. Cadman,
By Clarence A. O'Brien
Attorney

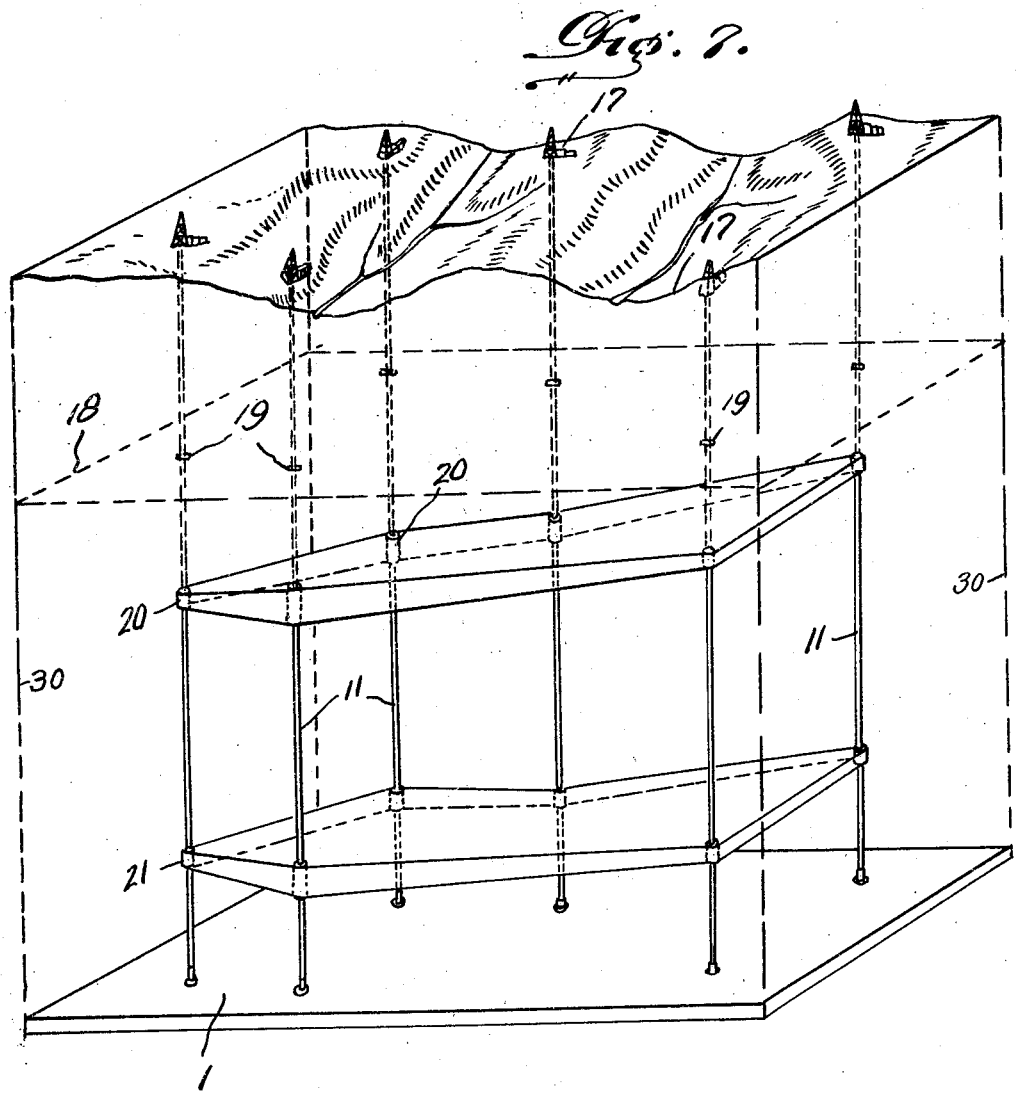

Patented Sept. 11, 1928.

1,683,952

UNITED STATES PATENT OFFICE.

WILSON K. CADMAN, OF EUREKA, KANSAS.

PHANTOGRAPH.

Application filed May 17, 1926. Serial No. 109,659.

This invention relates to a model for use in problems of applied geology, and provides a method and construction for graphically aiding in solving engineering problems in geology.

This invention comprehends the provision of a model of such a character that geological data may be displayed in its proportionate position with respect to the three dimensions in order that a graphic illustration as an aid to the solution of engineering problems may be made.

The invention comprehends numerous novel features residing in the method of graphically portraying geological data and the apparatus for placing this method in effect which is particularly pointed out in the following description and in the claims directed to the preferred form of construction, it being understood however, that various changes may be made in the construction, relation and assemblage of the parts without departing from the spirit and scope of the invention as herein set forth.

In the drawings forming part of this application:

Fig. 3 is an enlarged vertical sectional view showing the details of construction of one of the rod holders, one of the rods, and the devices mounted on a rod representing the desired data.

Figs. 4, 5 and 6 illustrate geological data-indicating elements for various formations which are provided with different colored peripheries.

Fig. 7 is a diagrammatic perspective illustrating the principle of the model.

The essential requirement of a device for illustrating the information proposed by this invention is that it must show a delineation of space in three dimensions. As such, it forms a model.

Figure 1:
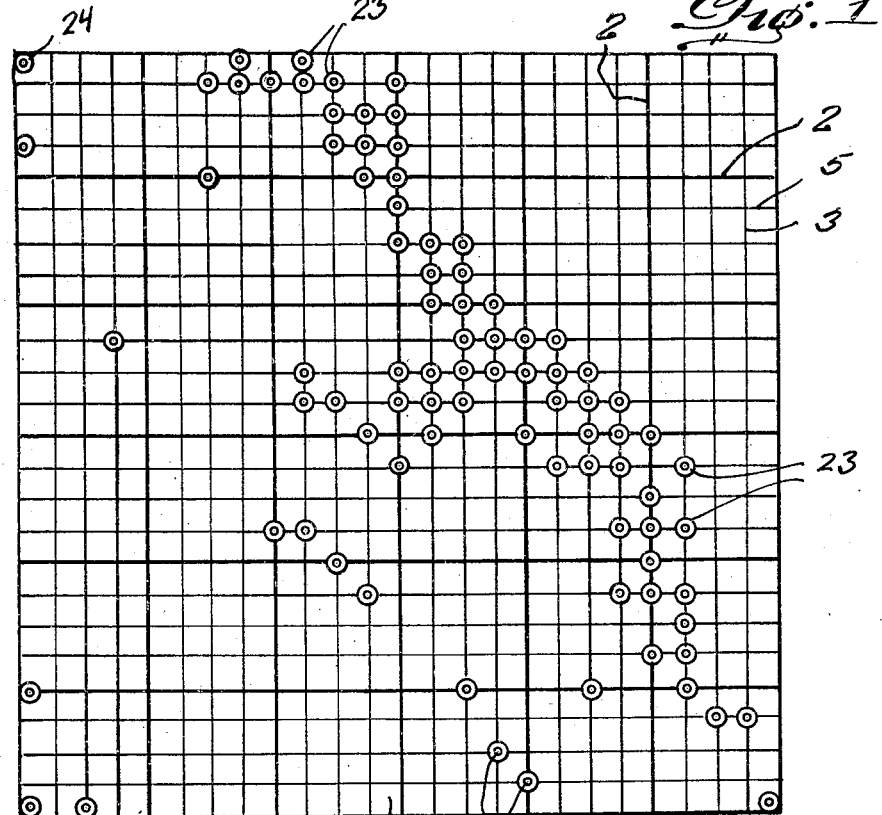
Figure 1 is a plan view of the plat board with a series of data indications applied thereto.

In carrying out these essential features, the invention includes a plat board 1 as clearly shown in Fig. 1 of suitable size so that it may be preferably sub-divided into squares to represent a standard township of sectionized land which is six miles square. The plat- board is ruled or suitably divided by the main division lines 2 for each square and by the supplemental division lines 3 into quarters which is the customary manner of identifying and sub-dividing townships. Suitable bar members 4 are attached in spaced parallel relation to the plat board 1 and carry the bars 5 by which the construction may be suitably supported above the floor of a building or the like.

Suitable rod holders 6 are adapted for detachable connection with the surface of the plat board 1 in the manner as clearly shown in Fig. 3, and includes sleeve members 7 having one end provided with an annular laterally extending flange 8 over which is crimped an end piece 9 forming the bottom of the socket which is provided with an opening to receive the nail or screw 10 by which the rod holder is secured in any desired location on the plat board 1.

Figure 2:
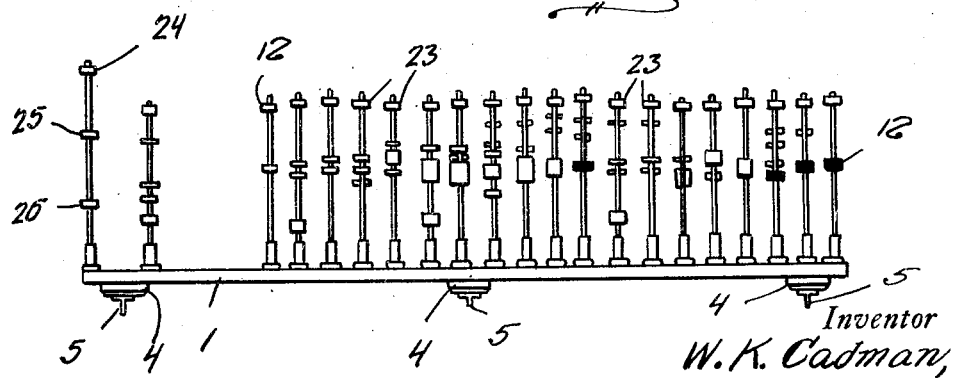
Fig. 2 is a side elevation of the plat board shown in Fig. 1, illustrating the desired geological data in its proportionate relation in accordance with a predetermined scale on three dimensions.

This plat board 1 is preferably made of wood, or the like, of such a nature that the rod holders may be readily applied thereto in the manner as shown in Figs. 1 and 2 of the drawings, and illustrated in detail in Fig. 3.

The rods are indicated at 11 and are adapted for a movable insertion into the holders 6 shown in Fig. 3, so that suitable stratum indicating elements 12 of annular form as shown in Figs. 3 to 6 inclusive, having central openings 13 may be applied to the rods as shown in Fig. 3 to any desired position where they will remain through frictional engagement on the rod. These elements 12 have a length to indicate the sectional thickness of the stratum which they are designed to represent and will vary in thickness in accordance with the variation of this stratum as indicated by the varying lengths of elements shown on the rod in Fig. 3. These elements may be constructed on suitable scales in proportion with the scale of the plat board and the rod so that they may be combined by mounting two or more in adjacent relation on the rod in showing or indicating a proportionate stratum thickness, rather than by cutting a single piece for each different stratum section desired. The peripheries of these annular stratum-indicating members or elements are suitably painted or otherwise colored as shown in Figs. 4, 5 and 6 in which the elements illustrated in Fig. 4 are provided with a blue color as shown at 14 which may for example indicate limestone. The element in Fig. 5 is provided with an orange colored periphery as indicated at 15 to indicate sand stone while the elements shown in Fig. 6 provided with a black periphery or without color, to indicate oil as shown at 16. Any other colors or combinations of colors may be used for desired indications in producing a model for the representation and illustration of geological data in space.

To fully illustrate the principle involved in this phantograph, special reference is made to Fig. 7 in which the rods 11 have been placed on the plat board 1 in accordance with the geographical location of drill holes in a township as represented by the plat board, the rods 11 illustrating each drill hole. The surface of the earth where the drill hole was started, is indicated in Fig. 7 at 17, diagrammatically, while the sea level datum is indicated by the dash line rectangle 18. The area of the intervening section of the model between the base 1 and the earth surface 17 is indicated by the vertically arranged dotted lines 30 shown at each corner thereof. The plat board may be at any datum plane selected, preferably lower than the lowest stratum which it is desired to indicate on the rods 7. This plate board is therefore positioned at a sub-sea level datum.

In Fig. 7, elements 12 have been placed on the rods 11 at the sea level datum as indicated on the several rods at 19. This datum is obtained from the information recorded in sinking the wells from the surface and also by calculation of the altitude of the location of the well above sea level so that all of the data on the rods may be computed in accordance with a predetermined scale from the measurements taken over a predetermined area and location of wells. Below the sea level datum in Fig. 7, elements 12 as indicated in Fig. 4 having a blue peripheral color, are placed the proper scale distance below the sea level datum that a limestone stratum is encountered and are of such a length as to represent the section of the limestone stratum through which the well was dug or bored as indicated at 20.

It will be noted that some of these elements indicated at 20 are of greater length than others, showing the variation in the section of stratum and are also located at varying distances on the rods relative to the sea level datum indicated at 19 so that the depth variation of the limestone stratum for different localities in the predetermined area is directly illustrated.

Below the limestone-indicating element as shown at 20 in Fig. 7, suitable elements 12 having orange colored surfaces as shown in Fig. 5 at 15 are positioned on the rod as indicated at 21, in Fig. 7, for indicating the sections and extent of a sandstone stratum or formation, and as in the case of the limestone, clearly shows the extent and variation in the section over the predetermined area as determined by the relation of the data obtained for the drilling of each well. The rods are not proportioned in length to the depth of the well as these wells may only be drilled to portions of the depth represented by the rod which merely form a continuation in line with the axis of the well to a desired sub-sea datum at which the platboard is arranged by predetermined calculation.

From the above description taken in connection with the illustration in Fig. 7, it will therefore be appreciated that the phantograph model constructed in accordance with this invention portrays on a proportionate scale throughout all the dimensions, the geological data of a section of the earth of predetermined size with reference to only certain selected data on which information is desired as represented by the elements in their associated relation as applied on all of the rods positioned on the board. This model further shows the relationship of the wells from which the data portrayed was obtained as well as suspends in space the representation of the stratum, and as a result of which numerous problems of engineering in geology can be solved with its aid in a more simple and expeditious manner in addition to enabling the user to anticipate expected results more accurately than heretofore.

Now by particular reference to Figs. 1 and 2, attention is called to the fact that these figures illustrate a complete model of actual results obtained in a predetermined township indicating a limestone stratum and an oil sand stratum. The limestone stratum is indicated at 23 by the elements 12 which are not colored, while the elements 12 shown in black as more clearly illustrated in Fig. 2, show the position of the oil sand or oil pockets and their extent in accordance with the location of the well, and illustrate the variation of the oil stratum over a township area with respect to the sea level datum as indicated by the element 24 on the rod at the corner of the plat board 1. In the illustration in Figs. 1 and 2, the data above the sea level datum has been omitted as it is entirely unnecessary for any purpose in numerous instances, while the limestone stratum and the oil sand stratum have been indicated in their proportionate positions with respect to the sea level datum 24, while the elements 25 and 26 on the same rod with the element 24, indicate "500" and "1000" feet respectively below the sea level datum 24 in order that the exact position of the various strata may be immediately approximated.

A method of indicating geological data in spaces is therefore provided which consists in the positioning of a plurality of elements suspended in predetermined relation, to represent the section of an entire stratum in its relative depth to a predetermined plane throughout a given area.

It will be furthermore clearly understood that a model construction has been provided which is of a simple form and adapted to permit the positioning of the elements on the board for a given area at any position where a well from which certain information is obtained is located, and that the device may be entirely disassembled, and rebuilt to represent the location of wells or data for another area.

Having thus described my invention, what I claim as new is:—

1. A device for illustrating geological data, consisting of means for suspending objects representing the data in space in a predetermined relation with a predetermined plane in accordance with a predetermined scale for each of three dimensions to form a model thereof.

2. A phantograph for illustrating geological strata formation, comprising a base, and a plurality of data-indicating elements of predetermined size positioned in a predetermined spaced relation with respect to said base and with each other for indicating relative to the base and therewith, three dimensions of a selected stratum formation.

3. A phantograph illustrating geological strata formations, comprising a base, a plurality of supporting members detachably connected with said base, and data-indicating elements of predetermined form adjustably mounted on said supporting members in a predetermined manner and in spaced relation with each other, said base-supporting members and elements displaying predetermined strata formation in three dimensions.

4. A phantograph, comprising a plat board, rod holders detachably mounted in a predetermined manner on the plat board, rod members removably mounted in said rod holders and extending laterally with respect to the plat board, and stratum-indicating elements of predetermined form adjustably mounted on said rods in a predetermined manner for cooperation with the plat board to indicate sections of a stratum in three dimensions, each of said elements being arranged in substantially horizontal spaced relation with each other.

5. A device for indicating geological strata formations in three dimensions comprising a plurality of supports and means suspended from each support indicating one dimension, the relative positions of said supports cooperating to define certain limits whereby to indicate the other two dimensions.

In testimony whereof I affix my signature.

WILSON K. CADMAN.